Figure 1:
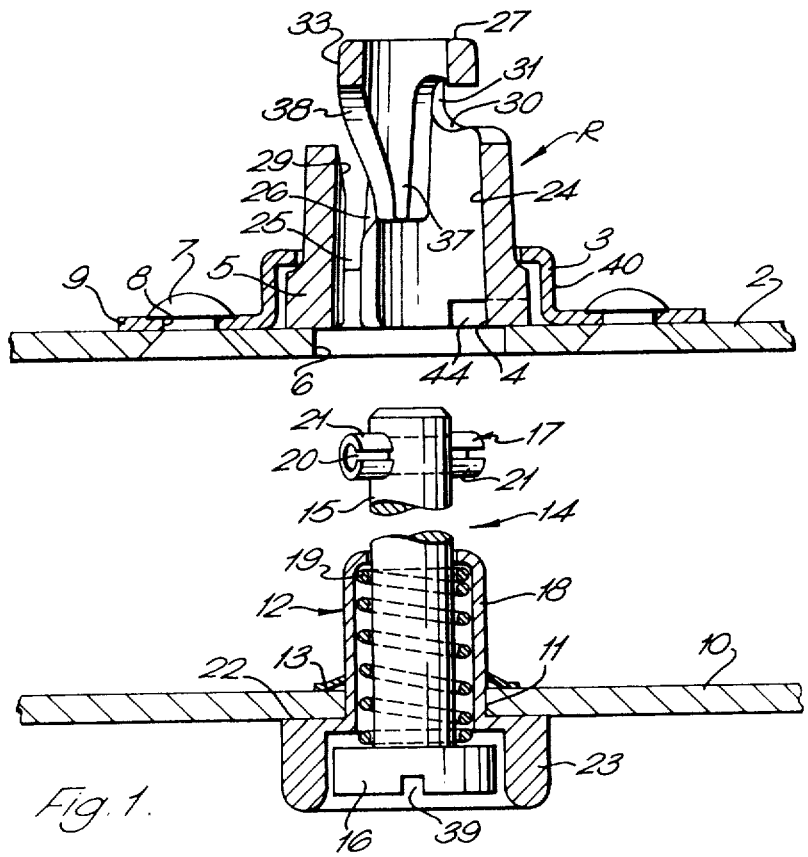

United States Patent

Winslade

[15] 3,675,280

[45] July 11, 1972

[54] FASTENERS

[72] Inventor: Harry Herbert Winslade, Feltham, England

[73] Assignee: Inter-Locked Fasteners Limited, Twickenham, Middlesex, England

[22] Filed: Dec. 4, 1970

[21] Appl. No.: 95,033

[30] Foreign Application Priority Data

March 6, 1970 Great Britain........................10928/70
Oct. 30, 1970 Great Britain........................51,842/70

[52] U.S. Cl. ....................................................24/221 K
[51] Int. Cl. ......................................................A44b 17/00
[58] Field of Search ..................................26/221 K, 221 R

[56] References Cited

UNITED STATES PATENTS

| | | | |
|---|---|---|---|
| 2,486,411 | 11/1949 | Huelster | 24/221 K |
| 3,136,017 | 6/1964 | Preziosi | 24/221 K |
| 2,884,677 | 5/1959 | Zahodiakin | 24/221 K |
| 2,975,667 | 3/1961 | Bross | 24/221 K |
| 3,152,822 | 10/1964 | Griffihs | 24/221 K |
| 3,169,293 | 2/1965 | Neuschotz | 24/221 K |

FOREIGN PATENTS OR APPLICATIONS 403,659 5/1943 Italy ........................24/221 K

*Primary Examiner*—Bernard A. Gelak
*Attorney*—Baldwin, Wight & Brown

[57] ABSTRACT

A fastener receptacle is adapted to receive a rotatable stud having a shank with a pin-like lateral projection thereon and comprises a body with a bore which accommodates the stud shank. The wall of the receptacle is provided with a slot which defines a helical ramp up which the pin-like projection passes during the fastening operation, the pin-like projection being held, by spring-loading of the stud, in a detent at the end of the ramp. Means are provided to attach the receptacle and stud to their respective panels or the like which are to be fastened together.

5 Claims, 16 Drawing Figures

PATENTED JUL 11 1972 3,675,280

SHEET 1 OF 3

Inventor
Harry Herbert Winslade
By Baldwin Wight & Brown
Attorneys

FASTENERS

The present invention relates to a fastening assembly comprising a receptacle which is adapted to cooperate with a rotatable stud, and especially to a novel receptacle for such an assembly.

The present invention provides a receptacle adapted to receive a rotatable stud comprising a shank having a pin-like lateral projection thereon, the receptacle comprising a rigid body having an opening in the base thereof adapted to admit the shank and the lateral projection, a bore leading from the said opening and adapted to receive the shank of the rotatable stud, the bore having a lateral extension adapted to receive the lateral projection, the wall defining the bore having a slot therein adapted to receive the lateral projection, the lowermost wall of the slot defining a helical ramp the upper end of which terminates in a detent for the lateral projection, and the lower end of which commences at the lateral extension.

Preferably, the rigid body is, above the base, substantially cylindrical, the bore extending therethrough substantially longitudinally.

The present invention further provides a fastener assembly comprising a receptacle as described above and a rotatable stud having a shank and a lateral projection thereon.

The fastener assembly of the present invention is suitable for fastening together two juxtaposed members, each of the members having an aperture therein so disposed that the apertures are in register when the members are in fastened relationship. The receptacle is adapted to be securely attached to one member with the opening in the receptacle body being coincident with the said aperture in that member; the rotatable stud is generally located in a housing which is secured in the aperture in the second member.

Preferably, the fastener assembly comprises a rotatable stud having a shank, a head and a pin-like lateral projection at the end remote from the head, a housing for the stud having an aperture therein and a spring located within the housing, the shank passing through the aperture in the housing such that the projection is external to the housing, the spring being adapted to oppose advancement of the stud head towards the aperture in the housing.

Generally, the shank is provided with a cross-pin which forms two diametral lateral projections. The receptacle will generally then be provided with opposed, but congruent, pairs of lateral extensions, slots, ramps and detents.

To effect fastening of the members one to another, the shank of the stud is passed through the opening in the receptacle and along the bore thereof. Each lateral projection will travel up a lateral extension to the bore. When each projection is located adjacent its respective ramp, the stud is rotated to cause the lateral projections to ride up the ramps and into the detents. Each detent is conveniently a notch or hollow into which the lateral projection fits after travelling up the ramp.

The assembly is especially suited for fastening one panel to another panel or to a frame member, e.g. in aircraft manufacture. The assembly may be used in internal and external locations.

It has been found that the fastening action can be rendered easier by extending that slot of which the lowermost wall defines the ramp in order to form the lateral extension to the bore; this obviates the need to "search" for the ramps, i.e. to rotate the stud in order to place the or each projection adjacent its ramp. The slot is extended as far as the opening in the receptacle body. By this means, the or each pin-like projection is guided directly to its ramp as the stud shank is inserted into the receptacle. In order to facilitate this, the leading edge (i.e. the edge facing the wall defining the ramp) of each slot at the entrance to the receptacle is preferably chamfered.

Generally, the stud is provided with a head at its end remote from the projection or cross-pin. The head may be in the form of a knob, which is preferably knurled, in order to facilitate rotation of the stud. Alternatively, the head may comprise a kerf so that rotation of the stud may be effected with the aid of a screwdriver or similar implement.

Advantageously, a spring or other means is provided to hold the lateral projections in the detents. Conveniently, a spring may be located in the housing of the stud so that it abuts the head of the stud. Movement of the projections along the extensions to the bore and up the ramps will, of course, be effected against the bias of the spring.

The receptacle may be fastened to its member by any convenient means. For example, the base of the receptacle may comprise an apertured lug or flange to allow fixing to the member by means of a screw or rivet. Alternatively, the base comprises a peripheral flange and a cage may be provided having side walls defining an enclosure adapted to accommodate the base, a transverse wall having an aperture therein through which the rigid body except the base may pass, the side walls defining a mouth remote from the transverse wall which is large enough to admit the base, a side wall having an apertured lug attached thereto whereby the cage may be firmly fixed to its respective member with the base held therein against the member. Advantageously the base has a cut-out therein, the cage having a lug on a side-wall thereof lying substantially in the plane of the cage flange, the cut-out being adapted to accommodate the lug, whereby rotation of the rigid body is limited.

A feature of the receptacle of this invention is that the portion of the stud shank above the pin-like projection can be accommodated in the section of the bore above the ramp, or ramps, and thereby centered and braced against stresses occurring in a direction other than parallel to the longitudinal axis of the shank. This arrangement protects the transverse projection from stress which might distort or even break it. Preferably the section of the bore above the ramp is so dimensioned that there is an interference fit of the stud shank in this section. The shank may be of such a length as to protrude from the aperture where the bore emerges at the top of the receptacle.

It has also been found that the stud shank can be braced against longitudinal stresses by the provision of a spring in the receptacle, conveniently in the portion of the bore above the detent, or detents, said spring being adapted to bear upon the stud shank when the latter is in position, thereby maintaining the pin-like projection in its detent.

Figure 2:
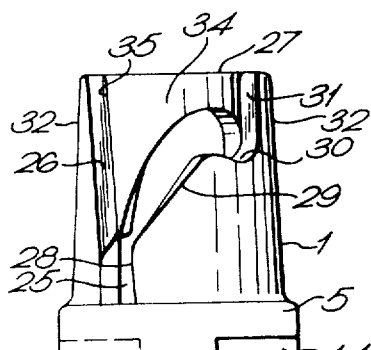
Figure 3:
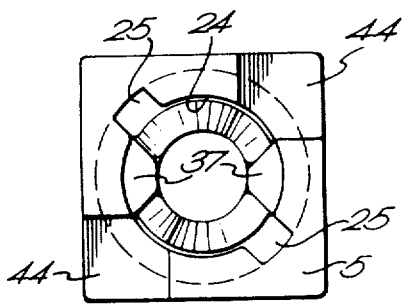
Figure 4:
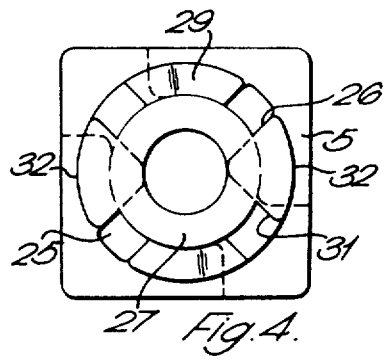
Figure 5:
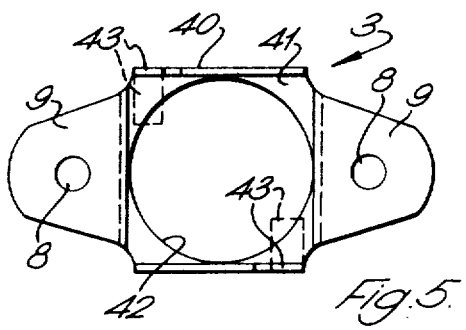
Figure 6:
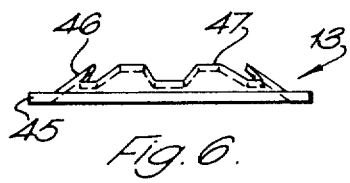
Figure 7:
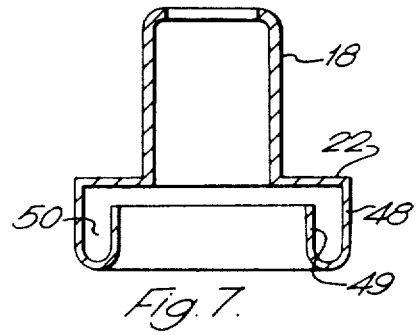
Figure 8:
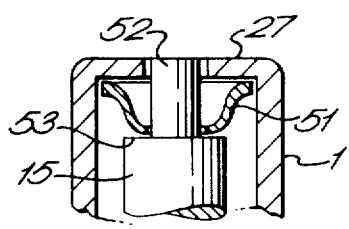
Figure 9:
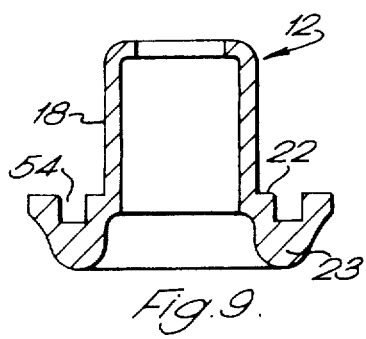
Figure 10:
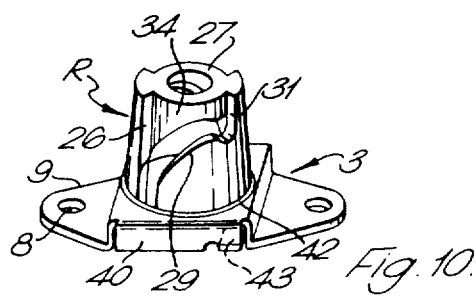
Figure 11:
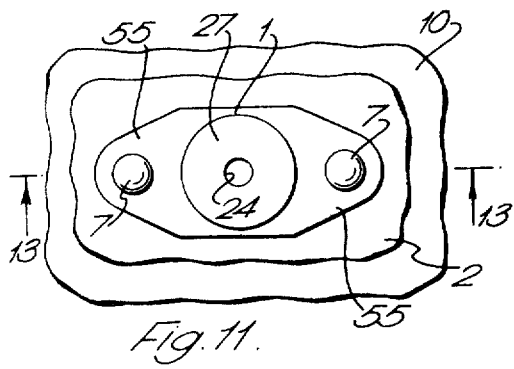
Figure 13:
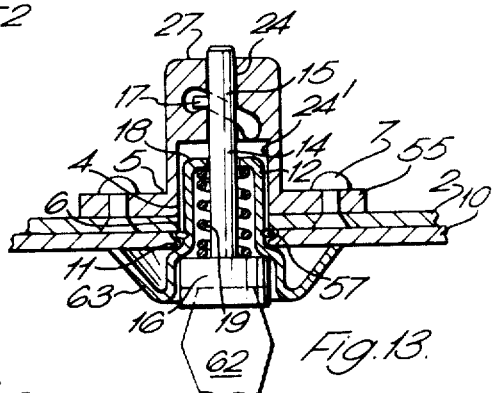
Figure 12:
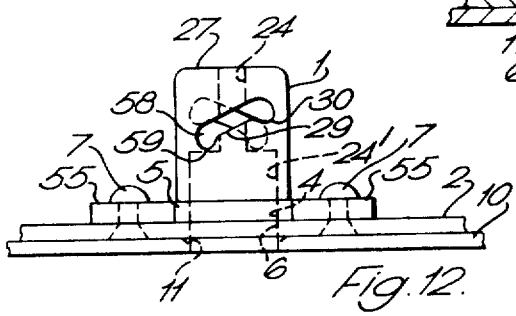
Figure 14:
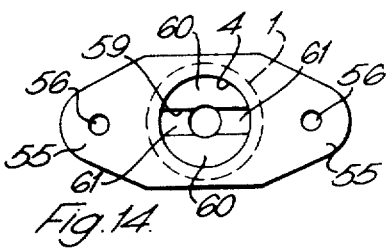
Figure 15:
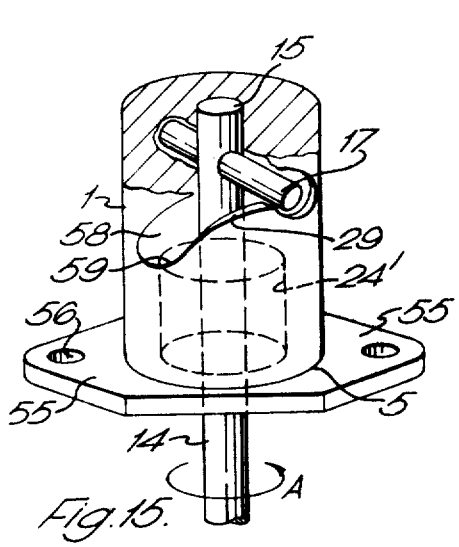
Figure 16:
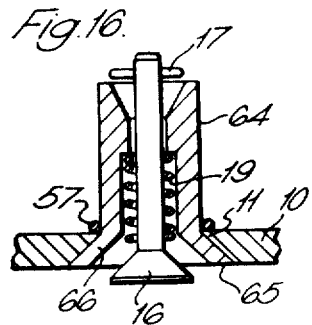

Presently preferred embodiments and other aspects of the present invention will now be described with reference to the accompanying drawings, in which:

FIG. 1 is a section through a receptacle and a stud prior to fastening,

FIG. 2 is a side view in the direction of the arrow A of the receptacle of FIG. 1, FIG. 3 is an underneath view of the receptacle of FIG. 2, FIG. 4 is a plan view of the receptacle of FIG. 2, FIG. 5 is a view of the cage shown in FIG. 1 in the direction of advance of the stud, FIG. 6 is a side view of a suitable retaining ring for the stud housing shown in FIG. 1, FIG. 7 is a longitudinal section through an alternative stud housing to that shown in FIG. 1, FIG. 8 is a section through the top portion of a receptacle having a spring therein, FIG. 9 is a longitudinal section through a further alternative stud housing, FIG. 10 is a perspective view of the receptacle, FIG. 11 is a plan view of an alternative receptacle to that of FIG. 1, FIG. 12 is a side view of the receptacle of FIG. 11, FIG. 13 is a section through line 13-13 of FIG. 11 showing a rotatable stud in fastening relationship with the receptacle, FIG. 14 is an underneath view of the receptacle shown in FIG. 11, FIG. 15 is a perspective view, partially broken away, of a receptacle and a stud shank having a cross-pin therein, and FIG. 16 shows yet another alternative form of housing for the stud.

Like parts are indicated by like numerals.

As can be seen in FIG. 1, the receptacle R is secured to a frame 2 by means of a cage 3 such that the opening 4 in the base 5 of the receptacle R is in register with an opening 6 in the frame 2. The cage 3 is secured to the frame 2 by means of two rivets 7, each of which masses through an aperture 8 in a flange 9 of the cage 3.

The panel 10, which is to be fastened to the frame 2 is provided with an aperture 11. A housing 12 is secured in the aperture 11 by means of a retaining ring 13, which engages the housing 12 and which overlies the margin of the aperture 11. Located in the housing 12 is a rotatable stud 14 having a shank 15, a head 16 and a cross-pin 17 located in a transverse bore near the end of the shank 15 which is remote from the head 16.

The housing 12 comprises an apertured cup 18 through which the shank 15 passes. A helical spring 19 is located in the cup 18 and is retained by the stud head 16; the spring and shank are substantially coaxial. It will be seen that to construct the stud and housing assembly, the cross-pin 17 must be inserted after the shank 15 has been passed through the spring 19 and the aperture in the spring-cup 18. The cross-pin 17 is constituted by a hollow metal cylinder having a longitudinal split 20. The split 20 allows the pin to be rolled up slightly and inserted into the transverse bore. When in place, the pin is allowed to unroll and the thickened ends 21 prevent the pin from sliding out of the bore. Thus, the ends must be separated by a distance not less than the diameter of the shank along the transverse bore and they must be larger in diameter than the transverse bore.

At the mouth of the spring-cup 18 there is formed an external annular shoulder portion 22, on which is formed a cylindrical wall 23 adapted to accommodate the stud head 16. The flat shoulder 22 lies flush with the surface of the panel 10 and helps to eliminate rocking of the housing 12.

The receptacle R, as can be seen in FIGS. 2–4, comprises a substantially cylindrical, hollow body 1 on a base 5 of substantially square plan. The receptacle is provided with a central bore 24 extending from opening 4 in the base 5. The body 1 is provided with two opposed, substantially longitudinal slots 25 which extend to the base of the receptacle. At a point which is a short distance above the base 5, the two walls defining each slot diverge, one wall 26 being at a small angle to the vertical and extending to the top 27 of the receptacle, the other wall 28 being at a larger angle to the vertical thereby forming a ramp 29. A hollow 30 is provided at the end of each ramp remote from the base: each hollow 30 provides a detent for an end 21 of the cross-pin 17.

The two sets of slots, ramps and detents are opposed, but congruent. The wall 28 extends beyond the hollow 30 forming a substantially longitudinal wall 31, which extends to the top 27. Each wall 31 and the immediately succeeding wall 26 define a column 32; the top 27, which is of annular plan, extends between the two columns 32. The diameter of the annulus 27 is substantially equal to the diameter of the bore 24 at the level of the hollows 30.

A curtain 33 depends from the annulus 27. This curtain forms two webs 34, each web extending from the inner edge 35 of a wall 26 to the inner edge 36 of the opposing wall 31. Between the two webs 34, the curtain 33 forms two lobes 37, each of which is adjacent a respective column 32. This construction enables the production of a receptacle which is light in weight without undue loss of strength and rigidity. The lower face 38 of each web 34 is spaced from its adjacent ramp 29, thereby forming a slot along which an end 21 of the cross-pin 17 can travel.

To effect fastening of frame 2 to panel 10 they are brought into juxtaposed relationship with the spring-cup 18 passing through aperture 6 and into the bore 24 of the receptacle R. The stud shank 15 is advanced along the bore 24 and each end 21 of the cross-pin 17 is passed along a respective slot 25 to the point of divergence of the walls 26 and 28. On rotating the stud shank 15, the ends 21 of the cross-pin 17 will ride up the ramps 29. The ramps have a camming effect and the stud shank 15 will advance further into the bore 24. The ends 21 of the cross-pin 17 are allowed to settle in their respective hollows 30 and the spring 19 acting both on the head 16 of the stud 14 and on the margin of the aperture in the housing will keep them firmly seated therein. The head 16 of the stud is provided with a kerf 39 to allow rotation of the stud 14 by means of a screwdriver.

As can be seen in FIGS. 5 and 10, the cage 3 comprises a well 40 of substantially square plan. A flange 9 extends from each of two opposed sides of the well 40, each flange 9 being provided with an aperture 8, which allows the cage to be screwed or riveted to a panel, frame or the like. The bottom 41 of the well 40 is provided with a circular aperture 42 through which the body 1 of the receptacle may be passed. The base 5 of the receptacle is large enough to ensure that it cannot pass through the aperture 42.

Lugs 43 may be provided on the periphery of the well 40. These lugs may be bent (as indicated in dotted lines in FIG. 5) into a plane parallel to the plane of the flanges 9 and will then be accommodated in the cut-out portions 44 in the base 5, thereby preventing undue rotation of the receptacle with respect to the cage 3.

FIG. 6 shows a suitable form of retaining ring 13, namely a washer of the "internal shake-proof" type. The washer comprises a flat annular rim 45 provided with an internal, crenellated collar 46, which is at an acute angle to the plane of the rim 45. To retain the housing 12, the washer is forced down around the spring-cup 18 until the rim 45 abuts the surface of the panel 10, the projections 47 of the crenellated collar 46 being in frictional engagement with the spring-cup 18.

The receptacle is preferably die-cast from any suitable material; a suitable material has been found to be an aluminum alloy LM5 or LM6. It is possible to employ other metals which can be die-cast, for example certain brass alloys or silicon bronze (although the latter may be too heavy for certain uses). The cross-pin is advantageously made of oil-hardened steel. The stud housing 12 conveniently is also die-cast, although a slight saving in weight may be achieved by using a housing of pressed metal, as shown in FIG. 7. Suitably, both the receptacle and the housing are anodized. Such an expedient tends to reduce wear on the ramp. As an alternative to anodizing, the components may be electro-nickel plated.

The housing of FIG. 7 comprises a spring-cup 18 connected via an annular shoulder portion 22 to a cylindrical well 48, which is formed with an internal lip 49. The space 50 enclosed by the lip 49 may be filled with any suitable material, e.g. nylon, to prevent accumulation of water therein.

In FIG. 8, there is shown in section the end of a receptacle body 1, said end being remote from the base. An apertured, cup-shaped spring 51 is located against the annular top 27. The stud shank 15 has an end portion 52 remote from the stud head (not shown), said end portion 52 being of smaller diameter than the main shank and defining a shoulder 53 in the shank above the cross-pin (not shown). The end portion 52 passes through the apertures in the spring 51 and the annular top 27 respectively, and is thus centered and braced. The spring 51 acting on the shoulder 53 supplements the spring 19 in the spring-cup 18 (not shown).

The alternative housing of FIG. 9 is similar in general principle to, and will be assembled in the same manner as, the housing 12. It will be seen, however, than an annular recess 54 is provided for an annular sealing member (not shown) in the shoulder 22 which is to be adjacent panel 10. The external wall 23 is tapered in shape, to add further stability to the housing and also to reduce the risk of damage to the housing should the wall 23 be knocked.

Referring now to FIGS. 10 to 14, the receptacle illustrated comprises a body 1 having a bore 24. Peripheral lugs 55 are located at the base 5 of the body 1 and are provided with holes 56 so that the receptacle may be secured to a frame 2 by means of rivets 7. The receptacle body 1 has an opening 4 in its base 5, which opening is in correspondence with aperture 6 in the frame 2.

Panel 10 which is to be fastened to frame 2 is provided with an aperture 11. A housing 12 is secured in the aperture 11 by means of a split ring 57 which is located in an annular groove in the housing 12 and which overlies the margin of the aperture 11.

Located in housing 12 is a rotatable stud 14 having a shank 15, a head 16 and a cross-pin 17 of which only one lateral projection is visible in FIG. 13.

Housing 12 comprises an apertured cup 18 through which the shank 15 passes. A spring 19 is located in the cup 18 and is retained by the stud head 16.

The receptacle is provided with two helical slots 58 in the side-wall of body 1. The lowermost sides of the slots 58 define ramps 29 which terminate at their upper ends in notches 30.

The body 1 is provided with an enlarged bore 24' below the lower edges 59 of the ramps 29; in other words, bore 24, in this region, is extended laterally in order to receive the lateral projections of the cross-pin 17 on the stud shank 15. At the level of the lower edges 59 of the ramps 29 the lateral extension to the bore is terminated by steps 60, leaving gaps 61 which provided access for the lateral projections to the side slots 58.

To effect fastening of panel 10 to frame 2, they are brought into juxtaposed relationship with the spring-cup 18 passing through aperture 6 and into the enlarged bore 24' of the receptacle. The stud shank 15 is advanced along the bore and each lateral projection of the cross-pin 17 is passed through a respective gap 61 and into a respective side slot 58. On rotating the stud shank 15 the lateral projections of the cross-pin will ride up the ramps 29. The ramps 29 having a camming effect and the stud shank 15 will advance further into the bore 24.

Means may be provided within the receptacle body 1 to guide the lateral projections into the slots 58 via gaps 61. Conveniently, this may be achieved by vaning or fluting the enlarged bore 24' of the receptacle.

In FIG. 13, the stud shank 15 is shown in the position of maximum advancement along the bore 24. As mentioned earlier, rotation of the stud may be effected using a screwdriver; the blade 62 of the screwdriver is shown in FIG. 13.

From the position shown in FIG. 13, the lateral projections of the cross-pin 17 are allowed to settle in the notches 30. The spring 19 keeps the projections firmly seated in the notches 30.

In FIG. 15, the receptacle is shown with a stud located therein. The lateral projections of the cross-pin 17 are seated in the notches 30. The arrow A shows the direction of rotation necessary to cause the lateral projections to ride up the ramps 29 and into the notches 30. To disengage the stud from the receptacle, all that is required is to rotate the stud shank in the direction counter to that indicated by the arrow A together with a slight initial upward movement if necessary. The cross-pin can be withdrawn through the gaps 61 and the enlarged bore 24'.

The receptacle of FIG. 15 is so constructed that the bore 24 terminates within the body 1, whereas in the receptacle of FIG. 11 the bore 24 opens to the top 27 of the receptacle. In either case, the section of the bore 24 which accommodates the portion of the stud shank 15 which is located above the cross-pin 17 is preferably of such a diameter as to provide a snug fit for the stud shank. As indicated above, by this means the shank is effectively centered and braced against stresses other than those occurring in a direction parallel to the longitudinal axis of the shank.

The cross-pin 17 of FIGS. 11-15 is provided by inserting a short length of stout wire into a transverse bore in the stud shank. The ends of the wire projecting from the shank are flattened or pinched in order to provide a transverse dimension greater than the diameter of the transverse bore in the shank thereby retaining the cross-pin.

Although the housing 12 shown in FIG. 13 has a flared rim 63 surrounding the stud head 16, it may be desirable to have no part projecting from that side of the panel 10 which is remote from the frame 2. This may be achieved, as shown in FIG. 16, by employing a bush 64 to house the stud. A frusto-conical skirt 66 is provided in the bush 64 to accommodate the frusto-conical head of the stud; the rim 65 of the skirt 66 lies flush with the surface of panel 10. A spring 19 may be provided which is adapted to abut the stud head 16 when the stud assembly is in fastening relationship with a receptacle, thereby biasing the lateral projections of the cross-pin 17 into their respective detents or hollows 30. The bush 64 may be held in place on panel 10 by means of a split ring 57 located in an annular peripheral groove in the bush 64, said split ring overlying the margin of the aperture 11 in panel 10.

The head 16 may carry any kerf design which is found convenient, including those designs which require special tools to engage the head.

Furthermore, instead of a split ring 57, a semicircular snapping having its ends turned inwards on a common diameter could also be used. The ends of the snap-ring would be fitted into diametrically disposed external recesses in the spring-cup or bush, the rest of the snap-ring overlying the margin of the aperture 11 in panel 10. If required, a washer could be located between the snap-ring and the margin of the aperture 11.

The edge of the flared rim 63 of the housing 12 of FIG. 13 need not abut the surface of panel 10. If a small clearance between the rim and the member is allowed, undesirable scoring of the surface of member 6 will be avoided; however, this may be at the risk of lessening the stability of the housing 12.

I claim:

1. The combination of a receptacle and a rotatable stud for securing together first and second frame members having respective first and second openings, said receptacle being pressure-moulded as a substantially cylindrical hollow body having axially opposite end faces one of which rests upon said first frame member, said hollow body being in part defined by a central axial bore extending between said opposite end faces, said body further including a base portion defined by an enlarged peripheral flange including as a portion thereof said one end face, cage means for encompassing and captively uniting said base portion against said first frame member, means between said base portion and said cage means for preventing relative rotation therebetween, at least one slot formed in said hollow body, said one slot having an axially directed portion directed through said one end face, remaining portions of said slot defining a helical ramp terminating at a hollow adjacent to but spaced from a second of said end faces, said hollow body at an area above said helical ramp being of a thickness less than to either side thereof; a housing receiving one end of said stud while another end carrying a radial detent projects outwardly thereof, a spring telescopically surrounding said stud at one end and biasing said detent toward said housing, and means securing said housing to said second frame member whereby upon telescopic insertion of said housing and stud into said bore said detent respectively travels through said one end face, said axially directed portion, said helical ramp and comes to rest in said hollow and being retained therein by said spring.

2. The combination as defined in claim 1 wherein said rotation preventing means are recessed means in said peripheral flange receiving lug means of said cage means.

3. The combination as defined in claim 1 wherein said peripheral flange has diametrically opposite corners, and said recessed means are disposed at said corners.

4. The combination as defined in claim 3 wherein said recessed means are slots opening into said hollow body.

5. The combination of a receptacle and a rotatable stud for securing together first and second frame members having respective first and second openings, said receptacle being pressure-moulded as a substantially cylindrical hollow body having axially opposite end faces one of which rests upon said first frame member, said hollow body being in part defined by a central axial bore extending between said opposite end faces, said body further including a base portion defined by an enlarged peripheral flange including as a portion thereof said one end face, cage means for encompassing and captively uniting said base portion against said first frame member, at least one slot formed in said hollow body, said one slot having an axially directed portion directed through said one end face, remaining portions of said slot defining a helical ramp terminating at a hollow adjacent to but spaced from a second of said end faces, said hollow body at an area above said helical ramp being of a thickness less than to either side thereof; a housing receiving one end of said stud while another end carrying a radial detent projects outwardly thereof, a spring telescopically surrounding said stud at one end and biasing said detent toward said housing, and means securing said housing to said second frame member whereby upon telescopic insertion of said housing and stud into said bore said detent respectively travels through said one end face, said axially directed portion, said helical ramp and comes to rest in said hollow and being retained therein by said spring.

* * * * *